April 22, 1930. W. W. ROBINSON 1,755,227
COLLAPSIBLE POULTRY COOP
Filed April 4, 1929 2 Sheets-Sheet 1
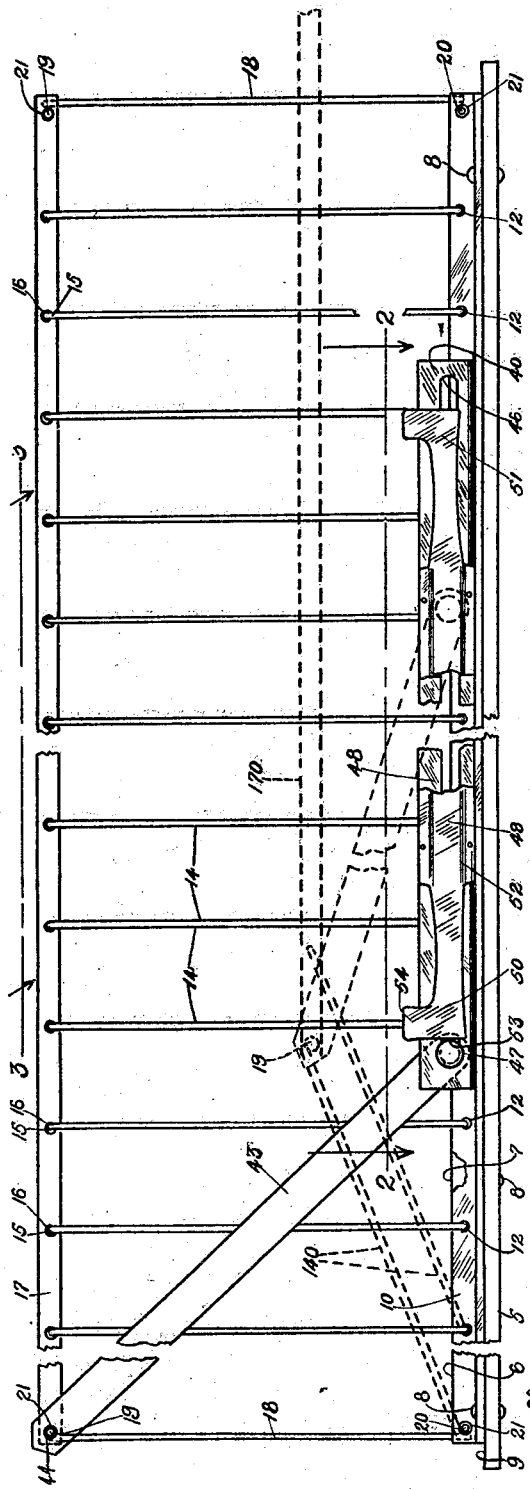
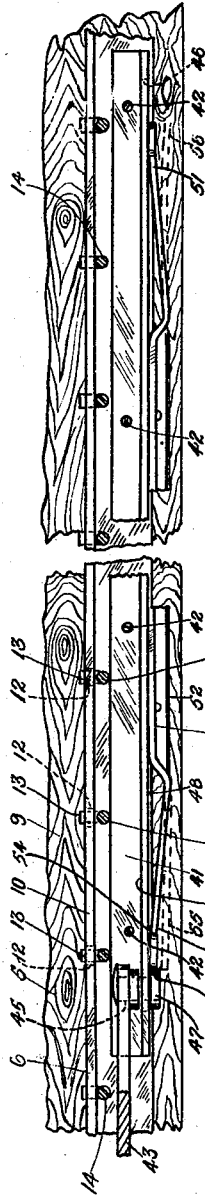
Inventor
William W. Robinson
By Murray and Zugelter
Attorneys

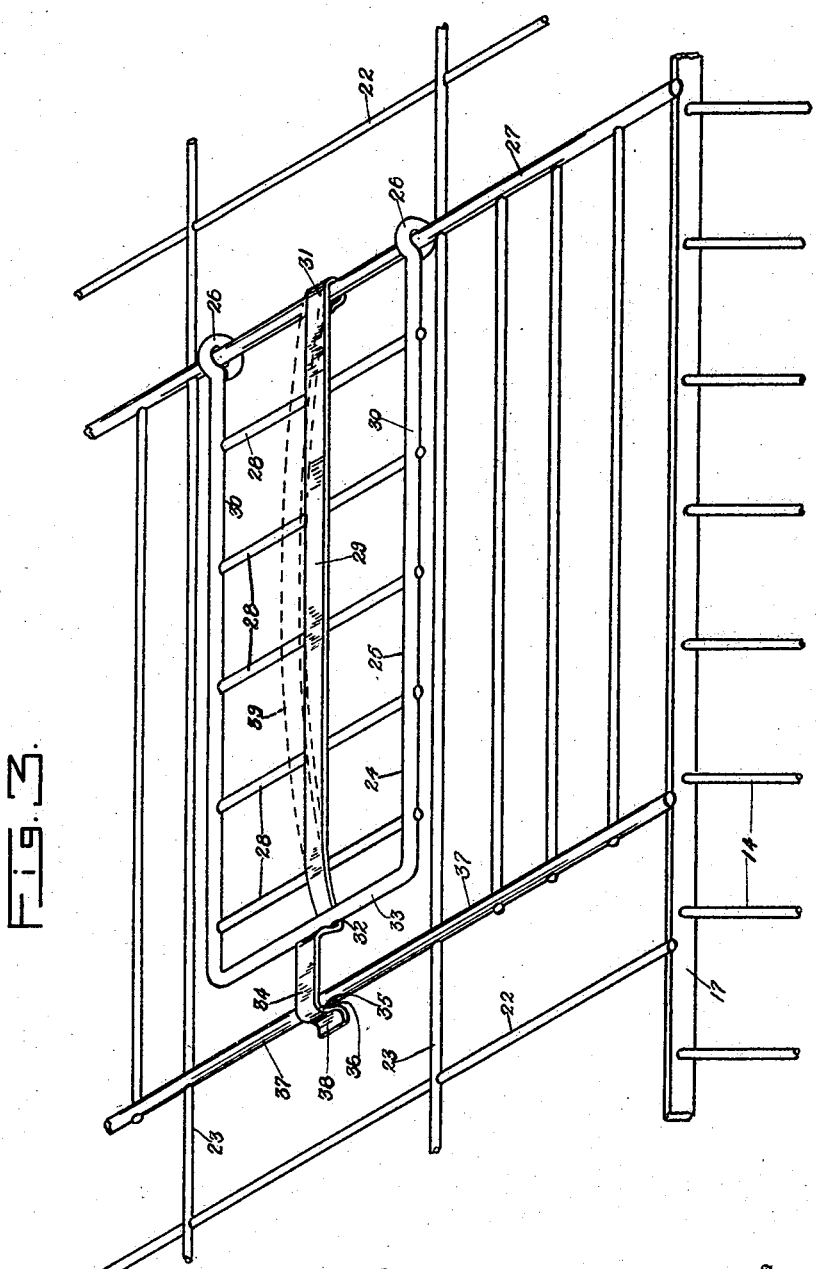

Patented Apr. 22, 1930

1,755,227

UNITED STATES PATENT OFFICE

WILLIAM W. ROBINSON, OF CHATTANOOGA, TENNESSEE

COLLAPSIBLE POULTRY COOP

Application filed April 4, 1929. Serial No. 352,573.

This invention relates to a collapsible poultry coop, an object of the invention being to provide improved means for retaining the coop in collapsed and extended positions.

Another object is to provide a simple and inexpensive means for the above purpose.

Another object is to provide a combination door latch and handle whereby the coop may be lifted bodily without danger of having the door to become unlatched.

These and other objects are attained by the means described herein and disclosed in the accompanying drawings, in which:

Fig. 1 is a side elevational view of the device in extended position, the collapsed position being shown in broken lines.

Fig. 2 is a cross sectional view taken on line 2—2 of Fig. 1.

Fig. 3 is a perspective view taken on line 3—3 of Fig. 1 and showing the door, handle, and latch means.

The device of invention comprises a base 5 of wood or other suitable material, which base forms the floor of the coop. Upon the base are mounted spaced parallel support members 6 and 7, which may be in the form of angle irons. Any suitable means, such as rivets 8, may be employed for securing the support members in parallelism upon the upper surface 9 of the base. The upwardly projecting leg 10 of each support member is provided, along its entire length, with a plurality of equally spaced perforations 12 which are adapted to freely receive the lower bearing ends 13 of a plurality of side members or rods 14. The upper end of each member 14 is provided with a similar bearing end 15 which is freely receivable in a perforation 16 of an upper support or frame member 17. The perforations of the upper members 17 correspond in number to those of the lower frame or support members 6 and 7, wherefore the rods 14 are disposed in parallelism and lie in a common plane. The bearing ends 13 and 15 preferably are mutilated or flattened to preclude their removal from the perforations 12 and 16, respectively. From the foregoing it should be clear that the upper and lower frame members may be moved longitudinally of one another in a vertical plane, said members approaching one another as the longitudinal movement is continued. This position, wherein the longitudinal frame members lie in proximity with the base 5, may be termed the collapsed position and is shown by broken lines 140 and 170 which indicate the rods 14 and upper frame member 17, respectively.

The ends of the coop comprise a plurality of spaced parallel vertical rods 18 the opposite ends of which are secured to transverse rods 19 and 20 rotatably mounted in bearings 21 of the upper and lower frame members, respectively. It should be clear, therefore, that as the coop is collapsed to assume the position indicated at 170, the rods or bars 18 forming the ends of the coop, will be rotated about pivots 20 to assume the position indicated at 140.

The top of the coop is formed by welding or otherwise securing to the upper frame members 17 the transverse bars 22 and the longitudinal bars 23. A door 24 is provided for the coop, said door being located in the center of the top. The door comprises a V-shaped rigid member 25 the free ends of which are provided with eyes or hinge members 26 which are adapted to freely receive therein the transverse rod 27. A plurality of cross bars 28 are welded or otherwise fixedly secured across the legs of the U-shaped member. A flat spring metal handle 29 lies normally upon the cross bars 28, in parallelism with the legs 30. One end of the handle is provided with a loop or hinge portion 31 mounted for rotation upon rod 27. The opposite end of the handle member is formed to provide an abutment 32, which is in constant abutment upon the connecting member 33 of the legs 30. The abutment 32 is retained in position by weaving the handle member beneath member 33 and above the adjacent cross bar 28. An extending portion 34 on the handle member is shaped to form a hook 35 forming, with the horizontal portion 34, substantially a semicircle. The lowermost portion 36 of the hook is disposed beneath the transverse rod 37. A finger piece 38 on the hook provides means whereby the hook may be disengaged from the rod 37. It should be noted that when the handle is grasped, it is flexed as indicated at 39. This flexing action serves to more tightly bind the hook 35 to rod 37, for it causes the lowermost portion 36 to move farther below the rod. It is apparent therefore that the coop may be safely and conveniently carried from place to place by means of the combination handle and lock.

Means are provided for locking the coop in either the collapsed or extended positions. Said means comprises a longitudinally slotted rail 40, which rail may be one leg of an angle iron, the other leg 41 thereof being secured by screws 42 to the base 5, exteriorly of the coop. An inclined brace 43 is pivotally mounted, at one end 44 thereof, upon the rod 19. The opposite end of the brace is provided with a stud 45 which is adapted to extend through and slide within the longitudinal slots 46 in member 40. An extending head 47 on the end of the stud, is adapted to slide along the outer face 48 of the rail member for the full length of the slot, when the coop is moved to the collapsed or extended positions.

The means for retaining the device in full extended or collapsed positions comprises a longitudinal latch member 49 secured to the rail and having identical flexible ends or abutment means 50 and 51 that are normally in abutment upon the face 48 of the rail 40. It will be apparent from the disclosure in Fig. 2, that the latch member is provided, along the body portion thereof intermediate the ends 50 and 51, with a channel portion 52. Said channel portion provides for unobstructed movement of head 47 along the rail. As shown in Fig. 2, the abutting edge 53 of member 50 normally is in abutment upon the head 47. By grasping the finger piece 54 thereof and moving the abutment means to the position shown by broken lines 55, the head 47 is free to move in slot 46 along the rail. The abutment means 51 on the opposite end of the latch member may be moved in a like manner (broken lines 56) to release the head 47 when the coop is collapsed. It will be apparent from the foregoing that a simple and efficient locking means is provided for retaining the coop in either the collapsed or extended positions.

It is to be understod that various changes and modifications may be made in the structural details of the device, within the scope of the appended claims, without departing from the spirit of the invention.

What is claimed is:

1. The combination of a container, an apertured top on the container, a door hingedly mounted upon the top for closing the aperture therein, a flexible handle means associated with the door and mounted for movement therewith, a gripping means responsive to flexing of the handle means, and means on the top of the container for cooperation with the gripping means for securing the door in locked condition relative to the top.

2. The combination of an apertured container, a door hingedly mounted upon the container for closing the aperture therein, a flexible handle means associated with the door, cooperative abutting means on the handle means and door said abutting means providing a fulcrum about which the handle means may move, a latch on the handle means, said latch being responsive to movement of the handle means, and means on the container for cooperation with the latch to retain the door in locked relation with the container, said means being subjected, through the latch, to strain caused by flexing of the handle means.

3. The combination with a base and a collapsible and extensible container mounted thereon, of a movable brace associated with the container for supporting the container in collapsed and extended positions, abutment means on the brace, a guide means immovable relative to the base for limiting movement of the brace relative to the base, and releasable abutment means adjacent to the ends of the guide means for cooperation with the abutment means of the brace to lock the brace against movement.

4. The combination with a base and a collapsible and extensible container mounted thereon, of a brace mounted upon the container for movement therewith and for supporting the container in collapsed and extended positions, abutment means on the brace, a slotted guide rail on the base adjacent to the container, the slot in said guide rail being adapted to slidably receive the abutment means, and spaced flexible abutment means for cooperation with the abutment means on the brace for locking the container in the collapsed and extended positions.

In testimony whereof, I have hereunto subscribed my name this 29th day of March, 1929.

WILLIAM W. ROBINSON.